United States Patent [19]

Shimp

[11] Patent Number: 4,494,138
[45] Date of Patent: Jan. 15, 1985

[54] SEGMENTED UPSTREAM MANAGEMENT FOR CABLE TELEVISION

[75] Inventor: Richard L. Shimp, Harrisonburg, Va.

[73] Assignee: ComSonics, Inc., Harrisonburg, Va.

[21] Appl. No.: 493,614

[22] Filed: May 11, 1983

[51] Int. Cl.³ ............................................. H04N 7/10
[52] U.S. Cl. ............................................. 358/86; 455/5
[58] Field of Search ................... 358/84, 86; 455/2, 3, 455/5; 370/73; 340/533, 536

[56] References Cited

U.S. PATENT DOCUMENTS

| 2,465,976 | 3/1949 | Goldsmith | 455/2 X |
| 3,996,578 | 12/1976 | Takeuchi et al. | 455/5 X |
| 4,066,966 | 1/1978 | Takeuchi et al. | 340/533 X |
| 4,114,150 | 9/1978 | Yamazaki et al. | 455/5 X |
| 4,245,245 | 1/1981 | Matsumoto et al. | 358/89 |
| 4,454,538 | 6/1984 | Toriumi | 358/86 |

OTHER PUBLICATIONS

Evers & Tonnemacher, "An Experimental Interactive Cable TV System", 1980 International Conference on Communications, Seattle, Wash., Jan. 8-12, 1980.

*Primary Examiner*—Keith E. George
*Attorney, Agent, or Firm*—C. Lamont Whitham

[57] ABSTRACT

A segmented upstream management system for a bidirectional coaxial network of the type including a bidirectional trunk (14) having a plurality of bidirectional feeders (12) and a plurality of drops (10) is disclosed. The management system includes a number of rerouting devices (36) connected in the bidirectional trunk at intervals so as to divide the number of drops into predefined groups. A plurality of upconverters (40) are connected to the outputs of the rerouting devices. The upconverters are in turn connected to a return only trunk (38) which transmits the frequency diverse, upconverted signals and each respective local oscillator signal from the upconverters to a hub or headend site (16). At the headend site, the return only trunk is connected to a plurality of synchronous down converters (42) which produce down converted signals from each of the predefined groups. FSK and other frequency-/phase dependent data retain coherence by phase locking each down converter to the actual local oscillator which provided each respective upconversion. The system has particular application to bidirectional CATV systems which carry digital data transmissions from subscriber drops to a central hub or headend site.

6 Claims, 4 Drawing Figures 4,494,138

SEGMENTED UPSTREAM MANAGEMENT FOR CABLE TELEVISION

FIELD OF THE INVENTION

The present invention generally relates to cable television (CATV) systems and more particularly to bidirectional coaxial networks of the type in which television video signals and supervisory interrogation signals are transmitted from a head end or hub to a plurality of subscribers and return signals are transmitted from each of the subscribers back to the hub or head end.

BACKGROUND OF THE INVENTION

CATV systems are well known for providing quality television viewing entertainment in rural areas where there is limited television reception and in high rise apartment buildings where the television recption in individual apartments is poor. Because of the large number of channels that may be accomodated in modern CATV systems, cable television is becoming increasingly popular even in areas where the television reception is good. First in apartment buildings and now more and more prevelant elsewhere, bidirectional CATV systems are being used for a variety of applications including security systems and educational programs. In a typical security system using a bidirectional CATV coaxial cable, video signals and interrogation signals are transmitted from the head end or a hub of the CATV system to a plurality of subscribers. At each subscriber location, one or more sensors such as an intrusion detector or a fire or smoke detector are connected to a transceiver that detects its unique address and responds to an interrogation signal. In an educational television system, students at various subscriber locations may be provided with equipment to respond to prompts from the television receiver.

Persons familiar with the state-of-the-art in CATV system upstream transport have come to realize the difficulties associated with providing this service reliably due mainly to multi-source noise build-up in the reverse direction. CATV systems are constructed very much like a tree in that from a single location, a trunk connects to many sub-branches and ultimately to a much higher number of subscriber bearing networks. The greater the number of subscribers, the greater the potential for noise accumulation at the point in the trunk system where ultimately all upstream signals combine. The noise is created in part by the electronic device required in the subscriber's location and in part by the vulnerability of subscriber interconnects or drops to interference from sources outside the cable plant. Unless controlled, the noise buildup in the system soon results in the system becoming unmanageable.

Schemes such as computer directed or signal triggered bridger switching have been devised to control upstream noise, but these schemes typically limit the number of data channels which can be simultaneously accomodated within a given bandwidth. While effective in reducing accumulated noise, switching introduced at the bridger station has the undesirable feature of limiting the time any given subscriber has access to the return circuit. It would, in fact, be impossible to supply a metropolitan area with home security using a sequentially polled system and simultaneously deliver uninterrupted video from a high school play without some form of over-ride to keep the school's upstream circuit active. In a densely populated area, it is not inconceivable for many users to demand simultaneous use of the network for an equal diversity of upstream functions.

SUMMARY OF THE INVENTION

It is therefore an object of the present invention to provide a bidirectional CATV system in which the network does not place temporal restrictions on available upstream bandwidth thus enabling simultaneous accomodation of a variety of data signaling rates.

It is another object of the invention to provide an upstream management system for bidirectional CATV systems which is effective in minimizing noise build-up while allowing essentially unlimited simultaneous use of the system by subscribers for a variety of functions.

It is a further and more particular object of the invention to provide a bidirectional CATV system which is especially suited for digital data transmission.

Briefly described, the invention involves a concept which the inventor has chosen to call "SUM", an acronym for Segmented Upstream Management. The principles of this concept may be understood by visualizing a CATV system in which a number of subscribers, say 3,000 to 6,000, has a return path unique from a neighboring group of subscribers with the same number. This return path could be a separate cable for each group of subscribers, but in urban areas especially, this approach would quickly result in an unweildly number of cables which would be both difficult to install aerially and visually unsightly. The system according to the invention allows upstream signals from a plurality of subscriber groups to be discretely transported on a single cable. This is accomplished by a frequency diversity system using upconversion so that the signal groups can be stacked for transport and then using synchronous downconversion at the hub or head end site so that the downconverted signals can be individually processed. FSK and other frequency/phase dependent data retain coherence by phase locking each down converter to the actual local oscillator which provided each respective upconversion.

BRIEF DESCRIPTION OF THE DRAWINGS

The foregoing and other objects, advantages and aspects of the invention will be better understood from the following description of a preferred embodiment of the invention with reference to the accompanying drawings, in which.

DESCRIPTION OF THE PREFERRED EMBODIMENT

Figure 1:
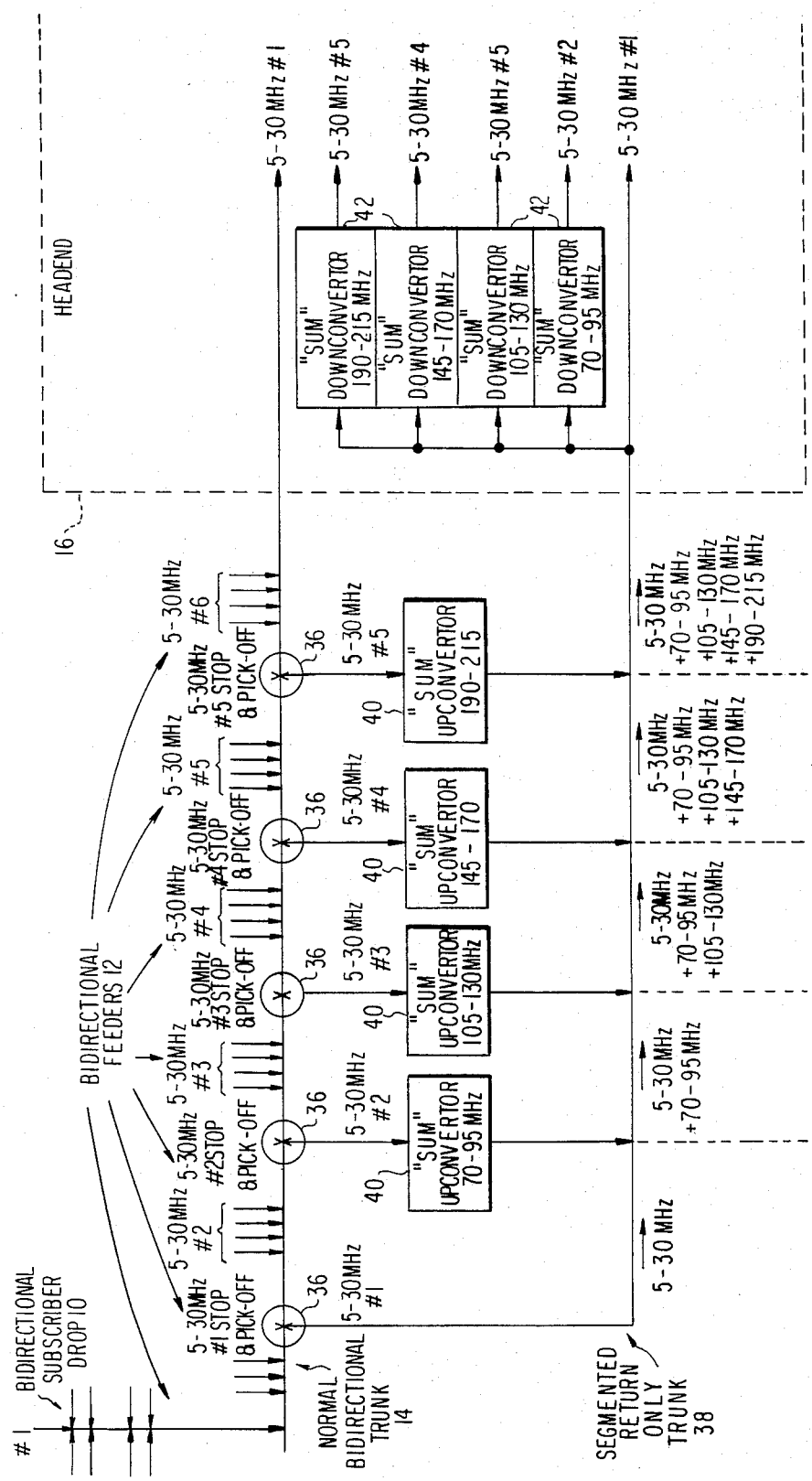
FIG. 1 is a block diagram showing the segmented upstream management system according to the invention.

Referring now to the drawings, and more particularly to FIG. 1, the upstream portion of a bidirectional coaxial network begins at the subscriber location, normally the end point for the largest application, that of cable television entertainment signal delivery. Information generated by a subscriber activated device, typically within but not limited to the frequency range of 5 MHz to 30 MHz, passes through the various sections of the system including the bidirectional subscriber drop 10, the bidirectional feeders 12, and the bidirectional trunk 14 until ultimately the termination site, either a hub or headend, is reached. In FIG. 1, a headend site 16 is indicated. The signal is then routed to its proper destination by the variety of electronic components that are resident at this site.

It is well known by those skilled in the technology of cable television that upstream subscriber active devices, like any other active device, unavoidably create a certain amount of Johnson noise. A single unit may pose no problem to the system. However, each time the number of units increases, so does the noise. Soon the network becomes unmanageable. In addition, it is common practice to provide subscriber interconnect (known in the industry as "drop" wires) with flexible coaxial cable using inexpensive connectors. Time has proven that subscriber drop cables represent the most vulnerable area in the system for shielding integrity loss since, for the most, the balance of the system is constructed using solid aluminum shield cable. A high percentage of drop cables are connected aerially and therefore may be exposed to relatively high level transmission signals such as, for example, business radio, ham radio, illegal CB transmissions, normal AM radio, normal FM radio and the like. Given a sufficient amount of aging, the cable drop having lost a fair portion of shielding integrity will become an antenna thus allowing a substantial amount of signal ingress. The probability is high that more than one drop cable within a geographical area will exhibit weakness to outside environment thereby creating the second and perhaps most significant cause of noise build up in the system.

Emperical data collected over the pioneering years suggests that limiting the number of respondents to within 3,000 to 6,000 persons allows a manageable network. FIG. 1 depicts the case where, beginning at the upper left corner, subscriber signals are inserted onto the bidirectional feeder 12, eventually reaching the bidirectional trunk 14. At some point along the bidirectional trunk 14, an adequate number of feeder cables will have been connected to the trunk so that between 3,000 and 6,000 subscribers are represented. It is at this point that the first segment, referred to as subscriber Group #1, is isolated from the balance of the system using a technique illustrated in FIG. 2. Since normal upstream signalling occupies the lower frequency band of available spectrum, these signals are isolated from higher frequency signals traveling in the opposite direction by using low pass filtering. When separated, amplified upstream signals are applied to a switching matrix which causes a reroute to an additional output port known in the industry as a "seventh port". The balance of the normal upstream path on the main trunk 14 is terminated at this point, thus enabling the beginning of a second set of subscribers referred to as Group #2. This process is repeated until all subscribers have been included into the network.

Figure 2:
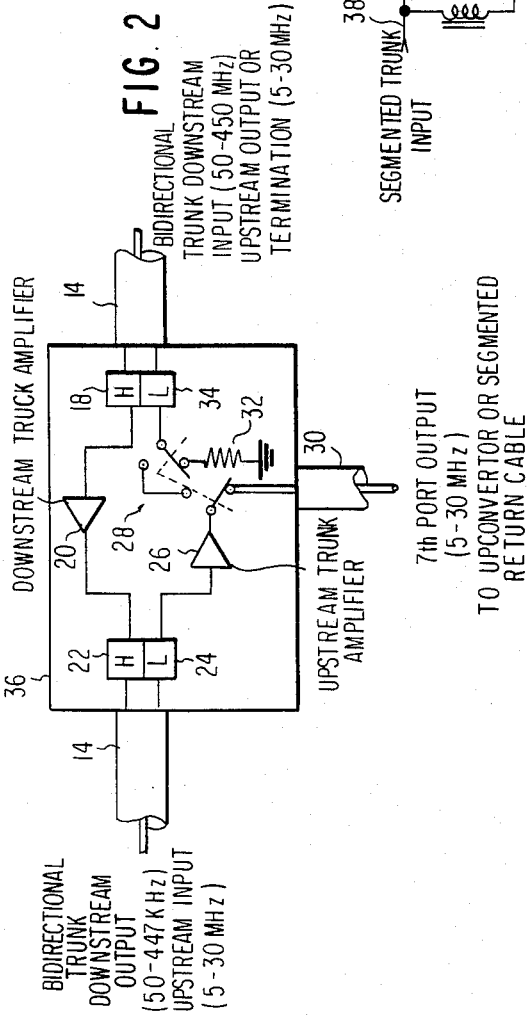
FIG. 2 is a block and schematic diagram of an output port used to divide subscribers into groups in the system shown in FIG. 1.

The "seventh port" used to segment subscribers in the system into groups is shown in FIG. 2 to which reference is now made. This device is inserted into the main trunk 14 and includes a first high pass filter 18 which, in the specific example shown, passes the upper frequency band of normal downstream signals in the range of 50 MHz to 450 MHz. The output of filter 18 is supplied to the input of downstream trunk amplifier 20, and the output of this amplifier is in turn supplied to a second high pass filter 22 and thence to the main trunk 14. The upstream signals in the frequency band of 5 MHz to 30 MHz on the other hand are passed by a first low pass filter 24, the output of which is supplied to the input of upstream trunk amplifier 26. The output of this amplifier is supplied to one blade of a double throw, double pole switch 28. In the switch postion shown in FIG. 2, the output of amplifier 26 is supplied to the "seventh port" output 30. The other blade of the switch 28 connects a terminating characteristic impedance 32 to the input of a second low pass filter 34 which in turn is connected to the main trunk 14. When the switch 28 is switched to its other postion, the output of amplifier is supplied directly to the input of low pass filter 34.

Referring again to FIG. 1, five of these "seventh port" devices are shown schematically as being inserted into the main trunk 14 and denoted by reference numeral 36. In the system illustrated, these five devices allow the system to be divided for upstream signal management into six groups of subscribers with each group containing between 3,000 and 6,000 subscribers. The output of the first device 36 is connected directly to a single return only trunk 38. The output of each subsequent device 36 is supplied to an upconverter 40 and thence to the return only trunk 38. Thus, for the example illustrated, upstream signals from subscribers in Group #2 are upconverted to a frequency range of 70 MHz to 95 MHz, those from Group #3 are upconverted to a frequency range of 105 MHz to 130 MHz, those from Group #4 are upconverted to a frequency range of 145 MHz to 170 MHz, and those from Group #5 are upconverted to a frequency range of 190 MHz to 215 MHz. The upstream signals from Group #6 are not rerouted from the main trunk 14 but rather are transmitted directly on this trunk to the headend site 16. Spatial segregation of the upstream signals from Groups #1 to #5 is thus accomplished by frequency diversity; stacking each 25 MHz group of return signals to the boundary of selected cable equipment bandwidth. As will be clear from the discussion of FIGS. 4 and 5 which follows, temporal dependence is preserved by transporting the actual upconversion local oscillator signal to the hub or headend site so that synchronous down conversion may be accomplished. This is represented in FIG. 1 by the downconverters 42 for subscriber Groups #2 to #5 at the headend site 16. Thus, it will be appreciated that at the headend site 16 the upstream signals in the band of 5 MHz to 30 MHz for each group of subscribers is available using only one return only trunk 38.

Figure 3:
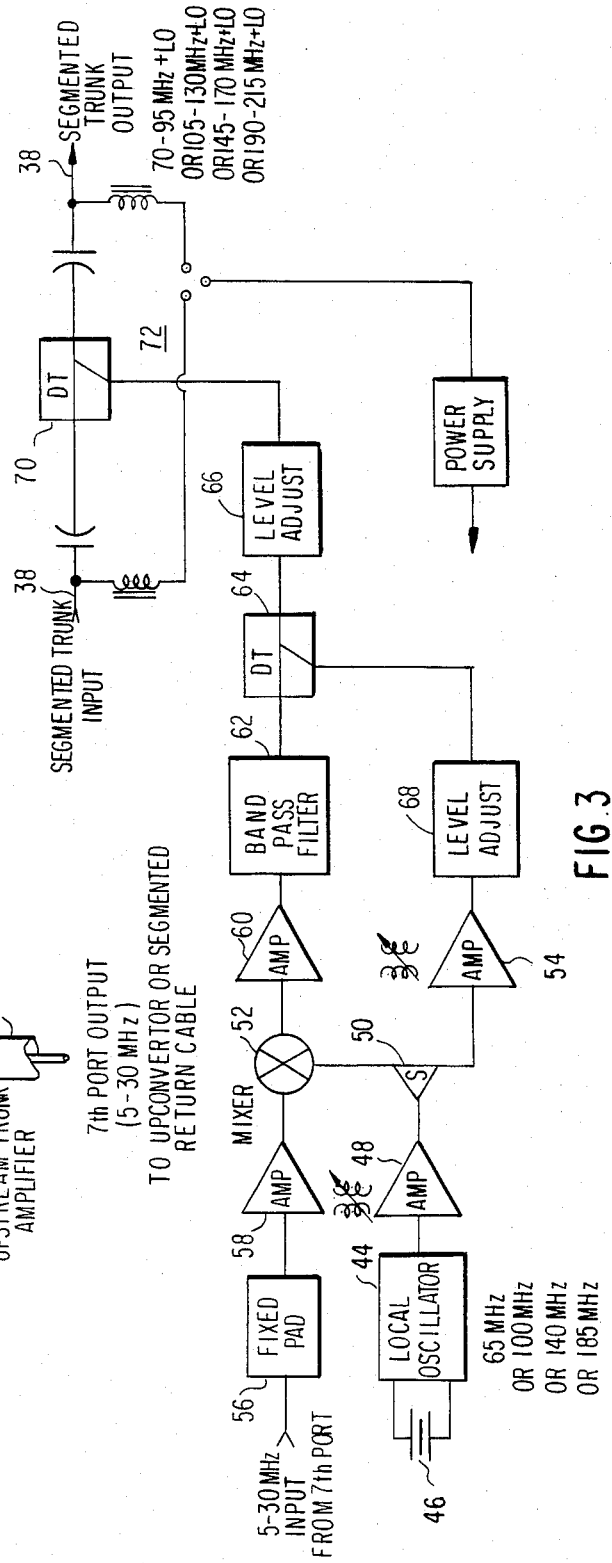
FIG. 3 is a block and schematic diagram of the upconverter used for the second and subsequent groups in the system shown in FIG. 1.

Referring now to FIG. 3, the upconverter 40 comprises a local oscillator 44 controlled by a crystal 46. For the example illustrated, the local oscillator output frequency is 65 MHz, 100 MHz, 140 MHz or 185 MHz depending on whether the upconverter is for subscriber Groups #2, #3, #4 or #5. The output of the local oscillator is supplied to a tuned amplifier 48 the output of which is connected to a power splitter 50. One output of the power splitter is supplied to a mixer 52, and the other output is supplied to a second tuned amplifier 54 which provides signal isolation. The output from one of the devices 36 is supplied to a fixed pad 56 and then to isolation amplifier 58 which supplies the other input to mixer 52.

The output of mixer 52 is amplified in amplifier 60 and supplied to a band pass filter 62. Again, in the example given, the pass band of filter 62 is 70 MHz to 95 MHz for Group #2, 105 MHz to 130 MHz for Group #3, 145 MHz to 170 MHz for Group #4, and 190 MHz to 215 MHz for Group #5. The output of band pass filter 62 is supplied via junction 64 to a level adjusting circuit 66. Meanwhile, the output of tuned amplifier 54 is supplied to another level adjusting circuit 68 the output of which is supplied to junction 64. Thus, the output of circuit 66 includes both the upconverted upstream signals and the signal from the local oscillator 44. The output of circuit 66 is connected to a junction 70 in an LC bridge 72 inserted into the return only trunk 38.

Figure 4:
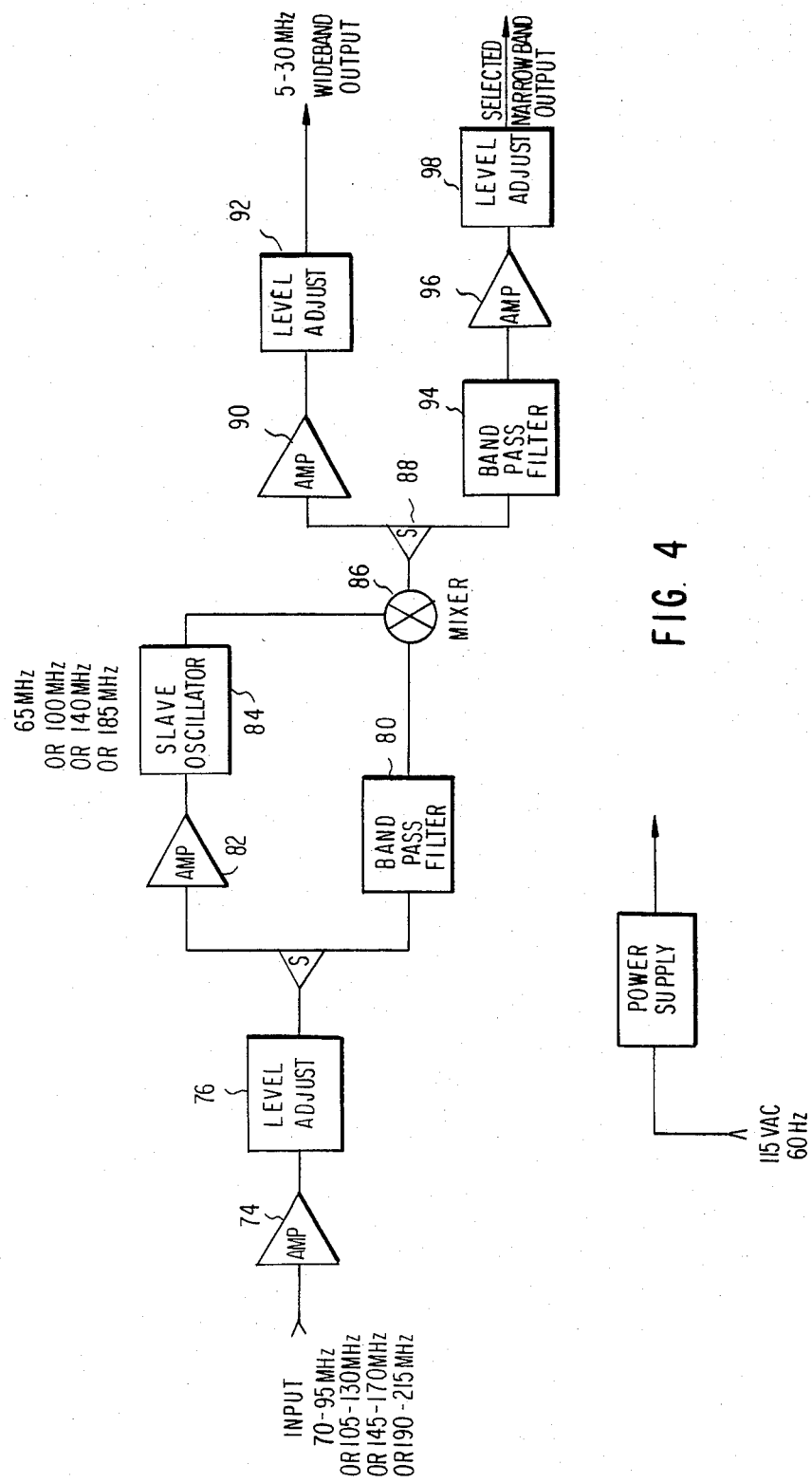
FIG. 4 is a block and schematic diagram of the downconverter used at the head end for the second and subsequent groups in the system shown in FIG. 1.

Down conversion at the headend site 16 is accomplished with the downconverter shown in FIG. 4. The return only trunk 38 is connected to an input isolation amplifier 74. The output of this amplifier is supplied via a level adjusting circuit 76 to a power splitter 78. One output of the power splitter 78 is supplied to a band pass filter 80 corresponding to the band pass filter 62 in FIG. 3. The other output of the power splitter 78 is supplied via tuned amplifier 82 to a slave oscillator 84. Thus, in the case of the downconverter for the Group #2 subscribers, amplifier 82 will be tuned to 65 MHz and therefore pass the signal from the local oscillator 44 injected onto the return only trunk 38 by the corresponding upconverter. As a result, the slave oscillator 84 will be locked both in frequency and phase with the corresponding local oscillator 44. This is necessary to obtain synchronous down conversion of the upstream signals.

Down conversion is accomplished in mixer 86 which receives its inputs from the band pass filter 80 and the slave oscillator 84. The output of mixer 86 is supplied to another power splitter 88. One output of power splitter 88 is supplied via amplifier 90 and level adjusting circuit 92 as a wide band output. This output typically would include analog or video signals. The other output of power splitter 88 is connected to the input of a band pass filter 94 to pass a selected narrow band of frequencies. The output of band pass filter 94 is supplied via amplifier 96 and level adjusting circuit 98 as a narrow band output. This output includes FSK and other frequency/phase dependent data. It is the synchronous conversion performed by the segmented upstream management system according to the invention that makes possible the transmission of this type of data from subscriber activated devices to a hub or headend site. This phase locked loop technology returns the subscriber signals to their original passband, and once restored to the original, signals may then be individually processed or combined for further processing.

While the frequency range stated for the illustrated example relates directly to the current trend followed by cable television technology, the invention can be applied to any chosen band of frequencies for which implementation hardware exists. It is most useful in those instances where an extremely large number of drop cables (subscriber interconnect cables) are connected to an active bidirectional coaxial network, operators of which envision a variety of responsive services.

I claim:

1. A segmented upstream management system for a bidirectional coaxial network, said network including at least one bidirectional trunk and a plurality of bidirectional feeders connected to said trunk, each of said feeders having a plurality of drops, said bidirectional trunk being connected to a hub or headend site from which broad band communication signals eliminate for transmission to each of said drops and to which narrow band communication signals propagate from each of said drops, said management system comprising:
    a plurality of rerouting devices spaced along said bidirectional trunk at selected intervals so as to divide the number of said drops connected to said trunk by said feeders into groups, each of said groups including a predetermined number of said drops, each of said rerouting devices being operative to divert said narrow band communication signals to an output port thereof;
    a plurality of upconverters each connected to an output port of a corresponding one of said rerouting devices, each of said upconverters translating said narrow band communication signals from the output port of its corresponding rerouting device to a different one of a plurality of predetermined higher frequency bands;
    a return only trunk connected between said hub or headend site and the outputs of each of said upconverters; and
    a plurality of synchronous down converters at said hub or headend site connected to said return only trunk, each of said down converters translating a different one of said plurality of predetermined higher frequency bands to the original narrow band communications signals corresponding to one of said groups, temporal dependence of said narrow band communications signals being preserved by said upconverters and said synchronous down converters.

2. The management system as recited in claim 1 further comprising an additional rerouting device for one group of drops, the output of which rerouting device is connected directly to said return only trunk.

3. The management system as recited in claim 2 further comprising a group of drops closest to said hub or headend site, wherein the narrow band communications signals from which group of drops closest to said hub or headend site are transmitted to said hub or headend site by said bidirectional trunk.

4. The management system as recited in claim 1 wherein each of said upconverters has a local oscillator which generates a local oscillator signal at a different one of a plurality of predetermined frequencies and the corresponding down converter is phase locked to the upconverter local oscillator frequency.

5. The management system as recited in claim 4 wherein the signals from each of said local oscillators are separately impressed on said return only trunk.

6. The management system as recited in claim 4 wherein each of said down converters includes a slave oscillator synchronized with the signal from a corresponding one of said local oscillators in said upconverters.

* * * * *